UNITED STATES PATENT OFFICE.

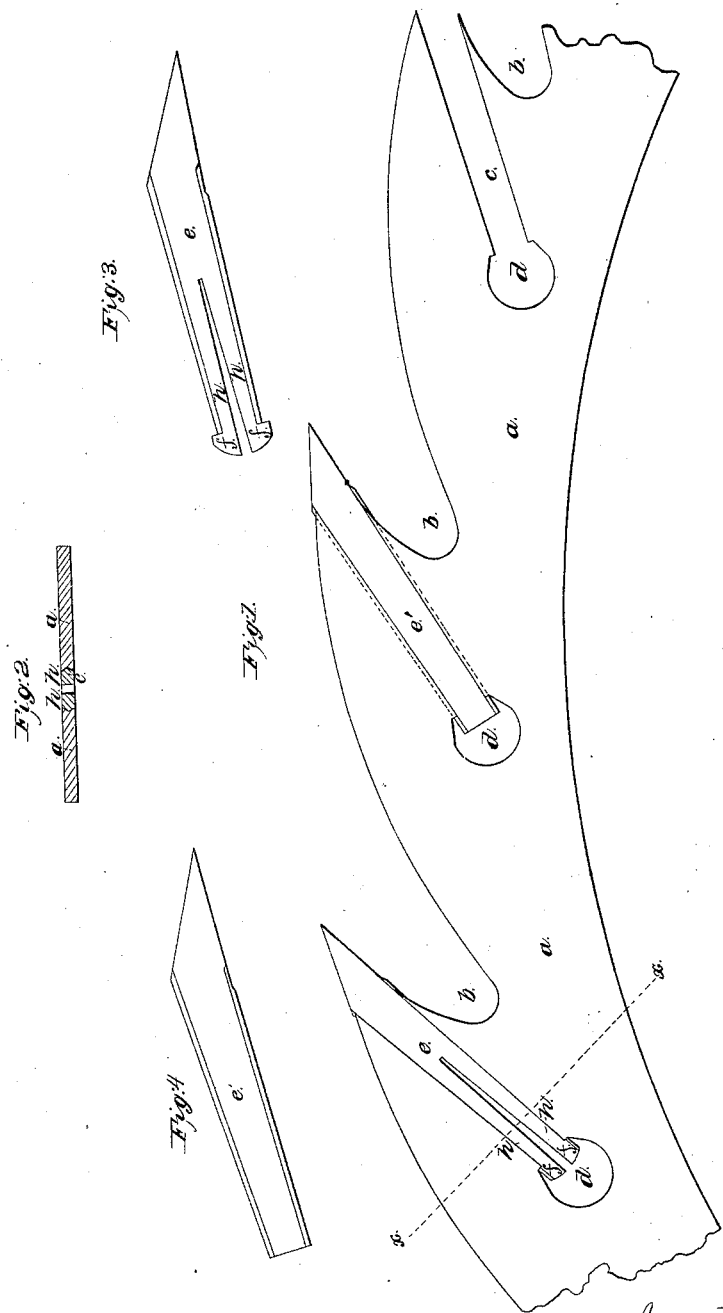

JOHN LIPPINCOTT, OF PITTSBURG, PENNSYLVANIA, ASSIGNOR TO HIMSELF AND THOMAS BAKEWELL.

IMPROVEMENT IN SAWS.

Specification forming part of Letters Patent No. 55,423, dated June 5, 1866.

*To all whom it may concern:*

Be it known that I, JOHN LIPPINCOTT, of the city of Pittsburg, in the county of Allegheny and State of Pennsylvania, have invented a new and useful Improvement in Circular and other Saws; and I do hereby declare the following to be a full, clear, and exact description thereof, reference being had to the accompanying drawings, forming part of this specification, in which—

Figure 1 is a section or piece of a circular-saw plate furnished with my improved removable teeth. Fig. 2 is a section through the saw-plate on the line $x$ $x$ of Fig. 1. Fig. 3 is a side view of one of my improved saw-teeth when made with a head. Fig. 4 is a side view of one of my improved saw-teeth when made without a head.

In the several figures like letters of reference denote similar parts.

The object of my improvement is to furnish teeth or teeth-points applicable to use either in circular or long saws, and which may be readily taken out of the saw-plate and replaced with ease and rapidity, and without removing the saw-plate from its arbor, or the use of any rivet or other fastening separate from the tooth itself.

The advantages secured by the use of my invention are that the saw-plate will not need filing or gumming, so that the original form of the saw-plate may be preserved without alteration for an indefinite length of time; that the teeth or teeth-points may be taken out of the saw-plate and sharpened on a stone and then replaced without disturbing the saw-plate; that there is no riveting required and no hammering on the sides of the saw-plate to remove or replace the teeth or teeth-points; that the teeth are not liable to fly out of place by centrifugal force, and that they will not become loosened in the saw-plate by its expansion, when heated by friction, in use.

To enable others skilled in the art to make use of my invention, I will proceed to describe the construction, use, and operation thereof.

In Fig. 1, $a$ is a part of a circular-saw plate, embracing so much of the circumference as to include three teeth. Each tooth of the saw has a throat or deep re-entering curve below it, (marked $b$,) as is usual in large saws. This, however, is not necessary to, and forms no part of, my invention, as the teeth or teeth-points may be inserted into the saw-plate either of a circular or long saw, the edge or face of which is unindented excepting by the slots made to receive the teeth, which project from the edge or circumference of the plate sufficiently to serve the purpose of a throat to each tooth.

From the point on the circumference or edge of the saw-plate whence the pointed extremity of each tooth is to project a slot, $c$, is cut in the saw-plate, tending downward into the body of the plate, at such an angle to the edge or face of the saw as it may be desired to give to the tooth-point. This slot $c$ is of such length as to give sufficient hold to the tooth in the body of the saw-plate without weakening the plate, and is slightly tapering, being widest at the edge or face of the saw. Each slot $c$ terminates in a circular or other shaped hole, $d$, the purpose of which is to admit of the insertion of a tool for the removal of the teeth, as hereinafter explained, and to facilitate the planing of the V-shaped grooves in the saw-plate along the edges of the slot $c$. These grooves and the manner in which they serve to hold the tooth $e$ in place laterally are shown in Fig. 2.

Fig. 3 represents the shape and construction of my improved saw-tooth when made with a head or projection at the lower end to prevent the possibility of the teeth flying out of circular saws when revolving rapidly. The tooth $e$ is a piece of steel pointed at one end, of such shape as is desired for the operative part of the tooth, and from the base or broadest part of the point back toward the rear end it tapers slightly to the head $f$, which extends on both edges a little beyond the edge of the body of the tooth. From the head to the base of the point of the tooth the edges are beveled, or V-shaped, to correspond with the grooves in the edges of the slots $c$. The lower end of the tooth is slit up from the head about half-way to the point, and the prongs $h$ $h$ thus formed are spread apart, so as to form a bifurcated tooth. The purpose of this arrangement and construction is to permit of the insertion of the tooth $e$ into the slot $c$ by compressing the prongs $h$ $h$, so as to bring them together, which will enable the head $f$ to enter the slot $c$ and pass down its entire length until it enters the enlargement or hole $d$, when the prongs spring apart, the beveled edges of the tooth enter the V-grooves in the slit c, and the shoulder formed by the head of the tooth rests against the face of the saw-plate at the end of the slit c, so as to prevent its passing outward again without the compression of the prongs h h of the tooth. The teeth should be so made that when they are forced down into the slit c as far as they will go, owing to their taper shape, the head f will just enter the hole d. If the saw-plate expands as it becomes heated, the tooth, being forced downward by the pressure against the wood in sawing sufficiently to tighten itself will never work loose, the taper of the tooth causing it to tighten as it is pressed downward or upward.

If it is desired to remove one of the bifurcated teeth e from the saw-plate it is only necessary to compress the ends of the prongs h h by means of any tool inserted into the hole d in the saw-plate, when, by an outward pressure on the tooth, the head f will enter the slot c, and the tooth is easily withdrawn.

Fig. 4 represents a tooth, e′, similar to that already described, and shown in Fig. 3, excepting that it has no head or enlargement at the rear end and is not bifurcated. This tooth, being tapered like the other and beveled at the edges, enters the slot c in the saw-plate and is seated by being pushed back into the plate as far as it will go. A tooth thus made will answer admirably for long saws, and even in circular saws will keep its place, as the operation of sawing constantly tends to fasten it more securely in its place; but, to avoid the possibility of accident, it may be preferable to use the bifurcated tooth with a head.

If desired, the tooth e′ (shown in Fig. 4) may be made with a bifurcated end and without a head, the outward pressure of the prongs preventing, in a great measure, the loosening of the tooth.

Instead of making the movable teeth with V-shaped edges, fitting a correspondingly-shaped groove in the saw-plate, the edges of the tooth may be grooved and the slot in the saw-plate beveled, and, if desired, the groove and bevel may be rounding instead of angular, these being obvious modifications of the specific construction shown in the drawings.

I am aware that movable saw-teeth have been inserted into the edge of a saw-plate and attached by rivets, and that ribs or points have been inserted into small parallel slots in the end of saw-teeth, secured thereto by projecting edges. I therefore do not claim either of these devices, the object of my invention being to prevent the necessity of riveting or upsetting the teeth or teeth-points in order to secure them to the plate and to have the sides of the movable tooth flush with the sides of the saw-plate; but What I do claim as my invention, and desire to secure by Letters Patent, is—

1. The use of tapering saw-teeth or teeth-points inserted into correspondingly-shaped slots in the saw-plate, having their sides flush with the side of the saw-plate and secured from lateral displacement therein, without riveting or upsetting, by the groove in the edges of the slot in the saw-plate and correspondingly-shaped edges of the tooth, (or groove in the edges of the tooth and beveled edges of the slot,) substantially as hereinbefore described.

2. The use of saw-teeth or teeth-points bifurcated at the rear end, and with or without a head or projection at the extremity of the prongs, for insertion into the plates of circular or long saws, substantially as and for the purposes hereinbefore set forth.

3. The tapering slot in the saw-plate for the insertion of the removable teeth, with an enlargement or opening at the rear end, for the purposes hereinbefore set forth.

In testimony whereof I, the said JOHN LIPPINCOTT, have hereunto set my hand.

JOHN LIPPINCOTT.

Witnesses:
W. BAKEWELL,
ALLAN C. BAKEWELL.